(12) United States Patent
Basu et al.

(10) Patent No.: US 12,039,452 B2
(45) Date of Patent: Jul. 16, 2024

(54) SYSTEM FOR PRODUCING SATELLITE IMAGERY WITH HIGH-FREQUENCY REVISITS USING DEEP LEARNING TO MONITOR VEGETATION

(71) Applicant: Satsure Analytics India Private Limited, Bangalore (IN)

(72) Inventors: Prateep Basu, Bangalore (IN); Rashmit Singh Sukhmani, Bangalore (IN); Sanjutha Indrajit, Bangalore (IN)

(73) Assignee: SATSURE ANALYTICS INDIA PRIVATE LIMITED, Bangalore (IN)

( * ) Notice: Subject to any disclaimer, the term of this patent is extended or adjusted under 35 U.S.C. 154(b) by 467 days.

(21) Appl. No.: 17/530,338

(22) Filed: Nov. 18, 2021

(65) Prior Publication Data

US 2022/0156492 A1    May 19, 2022

(51) Int. Cl.
*G06N 3/084* (2023.01)
*G06T 5/40* (2006.01)
*G06T 5/50* (2006.01)

(52) U.S. Cl.
CPC .............. *G06N 3/084* (2013.01); *G06T 5/40* (2013.01); *G06T 5/50* (2013.01); *G06F 2218/08* (2023.01); *G06F 2218/16* (2023.01); *G06T 2207/10036* (2013.01); *G06T 2207/20081* (2013.01); *G06T 2207/30188* (2013.01)

(58) Field of Classification Search
CPC . G06F 2218/08; G06F 2218/16; G06N 3/084; G06T 2207/10032; G06T 2207/10036; G06T 2207/20081; G06T 2207/20221; G06T 2207/30188; G06T 5/40; G06T 5/50; G06T 5/77; G06V 10/20; G06V 10/54; G06V 10/82; G06V 20/188; G06V 20/194
See application file for complete search history.

(56) References Cited

U.S. PATENT DOCUMENTS

| | | | | |
|---|---|---|---|---|
| 9,875,430 | B1* | 1/2018 | Keisler | ............... G06T 5/77 |
| 10,282,821 | B1* | 5/2019 | Warren | ............... G06T 7/90 |
| 10,852,421 | B1* | 12/2020 | Chartrand | ............ G06T 5/70 |
| 11,308,595 | B1* | 4/2022 | Wheeler | ........... G06T 7/0002 |
| 2003/0152292 | A1* | 8/2003 | Scott | ............... G06T 3/4053 |
| | | | | 382/302 |

(Continued)

*Primary Examiner* — Zhiyu Lu

(57) ABSTRACT

A system and method for processing satellite imagery with high-frequency revisit to monitor vegetation using a deep learning model 108 is provided. The system includes one or more satellites 102A-C, a vegetation monitoring server 106. The server receives a first set of satellite images and a second set of satellite images from one or more satellites 102A-B. The vegetation monitoring server 106 adjusts the first set of satellite images according to a spectral band of the second set of satellite images using pre-processing techniques. The deep learning model 108 generates a reconstructed image from a cloudy image of the first set of satellite images by replacing the cloudy and shadow pixels with the same pixels of the same image in third set of satellite images obtained from the satellite 102C. The vegetation monitoring server 106 generates observation data from the reconstructed image to provide vegetation monitoring to a geographical area.

17 Claims, 9 Drawing Sheets

(56) References Cited

U.S. PATENT DOCUMENTS

| | | | | |
|---|---|---|---|---|
| 2014/0212055 | A1* | 7/2014 | Boriah | G06V 20/13 |
| | | | | 382/224 |
| 2018/0330269 | A1* | 11/2018 | Cohen | G06V 20/188 |
| 2018/0337723 | A1* | 11/2018 | Arnaud | H04B 7/18541 |
| 2019/0050625 | A1* | 2/2019 | Reinstein | G06V 10/235 |
| 2021/0209424 | A1* | 7/2021 | Jha | G06V 10/82 |

* cited by examiner

SYSTEM FOR PRODUCING SATELLITE IMAGERY WITH HIGH-FREQUENCY REVISITS USING DEEP LEARNING TO MONITOR VEGETATION

CROSS-REFERENCE TO PRIOR-FILED PATENT APPLICATIONS

This application claims priority from the Indian provisional application no. 202041050222 filed on Nov. 18, 2020, which is herein incorporated by reference.

TECHNICAL FIELD

The embodiments herein generally relate to vegetation monitoring for agriculture, more particularly, a system and method of processing satellite imagery with a high-frequency revisit to monitor vegetation for agriculture using a deep learning model.

DESCRIPTION OF THE RELATED ART

Satellite Images are an essential source of information. With technological advancements in satellites, global information systems, aviation, digital photography, computer technology, and telecommunications, high-resolution satellite images, and aerial photographs are nowadays available virtually to everyone. However, obtaining satellite imagery for generating using earth observation data is extremely challenging, time-consuming, and expensive. The data from various satellites that are available free of cost publicly has its own set of discrepancies. Satellites generate earth observation data in an electromagnetic spectrum. However, a dataset containing only a solitary spectrum band data coupled with environmental factors such as a cloud cover is not of much value. Due to environmental factors, there is data loss, and insufficient data is obtained from the satellites at certain timestamps. The data loss or insufficient data might affect band data and analytics related to any practical application.

In some existing techniques, the observation data from a particular spectrum band is extracted for analysis, thus accuracy and quality in the analytics are reduced. Due to the cloud cover in the band data might also involve a time lag in generating analytics. Therefore, there arises a need to address the aforementioned technical drawbacks in existing technologies in processing satellite imagery accurately.

SUMMARY

In view of the foregoing, an embodiment herein provides a processor-implemented method for determining observation data from satellite images of a geographical area to monitor vegetation data in the geographical area. The method includes obtaining one or more satellite images of the geographical area from one or more satellites, the one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite. The method includes adjusting a spectral band of the first set of satellite images according to a spectral band of the second set of satellite images by pre-processing the first set of satellite images. The method includes determining at least one of a cloudy image on a day from at least one of the first set of satellite images or the second set of satellite images by comparing an intensity of each pixel of the at least one of the first set of satellite images and the second set of satellite images with a threshold intensity value, the cloudy image includes at least one cloudy or shadow pixel whose intensity is less when compared with the threshold intensity value. The method includes generating, using a remote sensing technique, one or more historical cloud masks using the first set of satellite images. The method includes training a deep learning model by providing one or more historical cloudy or shadow pixels and one or more historical cloud masks associated with one or more historical satellite images as training data to generate a trained deep learning model. The method includes generating, using the trained deep learning model, a reconstructed image for the cloudy image of the first set of satellite images by replacing the at least one cloudy or shadow pixel of the cloudy image with at least one labeled pixel of the first set of satellite images, the at least one cloudy or shadow pixel of the cloudy image is identified by a cloud mask. The method includes determining the observation data comprising a normalized difference vegetation index (NDVI), and a normalized difference water index (NDWI) from the reconstructed image to monitor vegetation data of the geographical area.

In some embodiments, the first set of satellite images, and the second set of satellite images are pre-processed by, (i) applying atmospheric corrections to remove effects of atmosphere on the first set of satellite images and the second set of satellite images to obtain atmospherically corrected first set of satellite images and the second set of satellite images (ii) resampling the atmospherically corrected first set of satellite images and the second set of satellite images; (iii) locating land co-ordinates of the geographical area on the first set of satellite images and the second set of satellite images that are resampled; (iv) obtaining surface properties of the geographical area based on the located land co-ordinates; and (v) adjusting the spectral band of the first set of satellite images according to the spectral band of the second set of satellite images based on the surface properties of the geographical area.

In some embodiments, the deep learning model is trained by, (i) obtaining, by a first generator, a third set of historical satellite images and converting a spectral band of the third set of historical satellite images to a common spectral band to generate a first set of converted images. (ii) obtaining, by a second generator, a first set of historical satellite images and converting a spectral band of the first set of historical satellite images to the common spectral band to generate a third set of converted images; (iii) providing, to a first discriminator (304A), the third set of historical satellite images and the first set of converted images to determine a first loss function when there is a difference between the third set of historical satellite images and the first set of converted images; (iv) providing, to a second discriminator, the first set of historical satellite images and the third set of converted images to determine a second loss function when there is a difference between the first set of historical satellite images and the third set of converted images; (v) backpropagating the first loss function to the first generator and the second loss function to the second generator to optimize the first set of converted images and the third set of converted images such that the first loss function and the second loss function becomes zero; (vi) generating an optimized converted third set of images as the historical cloud masks with the at least one labelled pixel to patch up the cloudy image of the first set of satellite images; and (vii) providing the historical cloud masks as the training data for training the deep learning model.

In some embodiments, the observation data is determined by, (i) determining the NDVI using a ratio of subtracting values of pixels of Near Infrared (NIR) band with values of pixels of Red (R) band and adding values of pixels of NIR band with values of pixels of the R band, and (ii) determining the NDWI using a ratio of subtracting values of pixels of NIR band with values of pixels of Short Wave InfraRed (SWIR) band and adding values of pixels of NIR band with values of pixels of the SWIR band.

In some embodiments, the first set of spectral bands, the second set of spectral bands, and the third set of spectral bands includes at least one of Synthetic Aperture Radar (SAR), Near Infrared (NIR), Short Wave InfraRed (SWIR), or Red Green Blue (RGB) bands.

In some embodiments, the method includes generating, using the trained deep learning model, a new image on the day when there is no image captured by the first satellite.

In some embodiments, the observation data from the reconstructed image are analysed to monitor vegetation data of the geographical area, the vegetation data includes at least one of a prediction window for sowing, a farm-level tillage area estimation, a sowing progress rate estimation, a high accuracy crop area estimation, monitoring crop health or stress monitoring at farm-level, a harvest prediction window, harvest progression, a crop yield estimation, or crop classification in tropical regions over a large area.

In some embodiments, a wavelength of NIR ranges from 726.8 micrometers to 938.8 nanometers for the first set of satellite images, a wavelength of SAR ranges from 1.1 centimeters to 0.8 centimeters for the first set of satellite images, a wavelength of SWIR ranges from 1522.7 nanometers to 1704.7 nanometers for the first set of satellite images, a wavelength of blue band ranges from 426.4 nanometers to 558.4 nanometers for the first set of satellite images, a wavelength of green band ranges from 523.8 nanometers to 595.8 nanometers for the first set of satellite images, a wavelength of red band ranges from 695.6 nanometers to 633.6 nanometers for the first set of satellite images, a wavelength of NIR ranges from 0.5 micrometers to 0.68 micrometers for the second set of satellite images, a wavelength of SAR ranges from 1.1 centimeters to 0.8 centimeters for the second set of satellite images, a wavelength of SWIR ranges from 11.5 micrometers to 12.5 micrometers for the second set of satellite images, a wavelength of blue band ranges from 0.45 micrometers to 0.515 micrometers for the second set of satellite images, a wavelength of green band ranges from 0.525 micrometers to 0.6 micrometers for the second set of satellite images, a wavelength of red band ranges from 0.630 micrometers to 0.680 micrometers for the second set of satellite images.

In one aspect, one or more non-transitory computer-readable storage medium store the one or more sequence of instructions, which when executed by a processor, further causes a method for determining observation data from satellite images of a geographical area to monitor vegetation data in the geographical area. The method includes the steps of (i) obtaining one or more satellite images of the geographical area from one or more satellites, the one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite; (ii) adjusting a spectral band of the first set of satellite images according to a spectral band of the second set of satellite images by pre-processing the first set of satellite images; (iii) determining at least one of a cloudy image on a day from at least one of the first set of satellite images or the second set of satellite images by comparing an intensity of each pixel of the at least one of the first set of satellite images and the second set of satellite images with a threshold intensity value, the cloudy image includes at least one cloudy or shadow pixel whose intensity is less when compared with the threshold intensity value; (iv) generating, using a remote sensing technique, one or more historical cloud masks using the first set of satellite images (v) training a deep learning model by providing one or more historical cloudy or shadow pixels and one or more historical cloud masks associated with one or more historical satellite images as training data to generate a trained deep learning model; (vi) generating, using the trained deep learning model, a reconstructed image for the cloudy image of the first set of satellite images by replacing the at least one cloudy or shadow pixel of the cloudy image with at least one labeled pixel of the first set of satellite images, the at least one cloudy or shadow pixel of the cloudy image is identified by a cloud mask; and (vii) determining the observation data comprising a normalized difference vegetation index (NDVI), and a normalized difference water index (NDWI) from the reconstructed image to monitor vegetation data of the geographical area In another aspect, a system for determining observation data from satellite images of a geographical area to monitor vegetation data in the geographical area. The system includes a vegetation monitoring server that receives one or more satellite images of the geographical area from one or more satellites, the one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite The system includes a memory that stores a database and a set of instructions and a processor that is configured to execute the set of instructions and is configured to (i) adjust a spectral band of the first set of satellite images according to a spectral band of the second set of satellite images by pre-processing the first set of satellite images; (ii) determine at least one of a cloudy image on a day from at least one of the first set of satellite images or the second set of satellite images by comparing an intensity of each pixel of the at least one of the first set of satellite images and the second set of satellite images with a threshold intensity value, the cloudy image includes at least one cloudy or shadow pixel whose intensity is less when compared with the threshold intensity value; (iii) generate, using a remote sensing technique, one or more historical cloud masks using the first set of satellite images; (iv) train a deep learning model by providing one or more historical cloudy or shadow pixels and one or more historical cloud masks associated with one or more historical satellite images as training data to generate a trained deep learning model; (v) generate, using the trained deep learning model, a reconstructed image for the cloudy image of the first set of satellite images by replacing the at least one cloudy or shadow pixel of the cloudy image with at least one labeled pixel of the first set of satellite images, the at least one cloudy or shadow pixel of the cloudy image is identified by a cloud mask; and (vi) determine the observation data comprising a normalized difference vegetation index (NDVI), a normalized difference water index (NDWI) from the reconstructed image to monitor vegetation data of the geographical area.

In some embodiments, the deep learning model is trained by, (i) obtaining, by a first generator, a third set of historical satellite images and converting a spectral band of the third set of historical satellite images to a common spectral band to generate a first set of converted images. (ii) obtaining, by a second generator, a first set of historical satellite images and converting a spectral band of the first set of historical satellite images to the common spectral band to generate a third set of converted images; (iii) providing, to a first discriminator (304A), the third set of historical satellite images and the first set of converted images to determine a first loss function when there is a difference between the third set of historical satellite images and the first set of converted images; (iv) providing, to a second discriminator, the first set of historical satellite images and the third set of converted images to determine a second loss function when there is a difference between the first set of historical satellite images and the third set of converted images; (v) backpropagating the first loss function to the first generator and the second loss function to the second generator to optimize the first set of converted images and the third set of converted images such that the first loss function and the second loss function becomes zero; (vi) generating an optimized converted third set of images as the historical cloud masks with the at least one labelled pixel to patch up the cloudy image of the first set of satellite images; and (vii) providing the historical cloud masks as the training data for training the deep learning model.

In some embodiments, the deep learning model is trained by, (i) obtaining, by a first generator, a third set of historical satellite images and converting a spectral band of the third set of historical satellite images to a common spectral band to generate a first set of converted images; (ii) obtaining, by a second generator, a first set of historical satellite images and converting a spectral band of the first set of historical satellite images to the common spectral band to generate a third set of converted images; (iii) providing, to a first discriminator (304A), the third set of historical satellite images and the first set of converted images to determine a first loss function when there is a difference between the third set of historical satellite images and the first set of converted images; (iv) providing, to a second discriminator, the first set of historical satellite images and the third set of converted images to determine a second loss function when there is a difference between the first set of historical satellite images and the third set of converted images; (v) backpropagating the first loss function to the first generator and the second loss function to the second generator to optimize the first set of converted images and the third set of converted images such that the first loss function and the second loss function becomes zero; (vi) generating an optimized converted third set of images as the historical cloud masks with the at least one labelled pixel to patch up the cloudy image of the first set of satellite images; and (vii) providing the historical cloud masks as the training data for training the deep learning model.

In some embodiments, the observation data is determined by, (i) determining the NDVI using a ratio of subtracting values of pixels of Near Infrared (NIR) band with values of pixels of Red (R) band and adding values of pixels of NIR band with values of pixels of the R band, and (ii) determining the NDWI using a ratio of subtracting values of pixels of NIR band with values of pixels of Short Wave InfraRed (SWIR) band and adding values of pixels of NIR band with values of pixels of the SWIR band.

In some embodiments, the first set of spectral bands, the second set of spectral bands, and the third set of spectral bands includes at least one of Synthetic Aperture Radar (SAR), Near Infrared (NIR), Short Wave InfraRed (SWIR), or Red Green Blue (RGB) bands.

In some embodiments, the method includes generating, using the trained deep learning model, a new image on the day when there is no image captured by the first satellite.

In some embodiments, the observation data from the reconstructed image are analysed to monitor vegetation data of the geographical area, the vegetation data includes at least one of a prediction window for sowing, a farm-level tillage area estimation, a sowing progress rate estimation, a high accuracy crop area estimation, monitoring crop health or stress monitoring at farm-level, a harvest prediction window, harvest progression, a crop yield estimation, or crop classification in tropical regions over a large area.

In some embodiments, a wavelength of NIR ranges from 726.8 micrometers to 938.8 nanometers for the first set of satellite images, a wavelength of SAR ranges from 1.1 centimeters to 0.8 centimeters for the first set of satellite images, a wavelength of SWIR ranges from 1522.7 nanometers to 1704.7 nanometers for the first set of satellite images, a wavelength of blue band ranges from 426.4 nanometers to 558.4 nanometers for the first set of satellite images, a wavelength of green band ranges from 523.8 nanometers to 595.8 nanometers for the first set of satellite images, a wavelength of red band ranges from 695.6 nanometers to 633.6 nanometers for the first set of satellite images, a wavelength of NIR ranges from 0.5 micrometers to 0.68 micrometers for the second set of satellite images, a wavelength of SAR ranges from 1.1 centimeters to 0.8 centimeters for the second set of satellite images, a wavelength of SWIR ranges from 11.5 micrometers to 12.5 micrometers for the second set of satellite images, a wavelength of blue band ranges from 0.45 micrometers to 0.515 micrometers for the second set of satellite images, a wavelength of green band ranges from 0.525 micrometers to 0.6 micrometers for the second set of satellite images, a wavelength of red band ranges from 0.630 micrometers to 0.680 micrometers for the second set of satellite images.

BRIEF DESCRIPTION OF DRAWINGS

The embodiments herein will be better understood from the following detailed description with reference to the drawings, in which.

DETAILED DESCRIPTION

Figure 1:
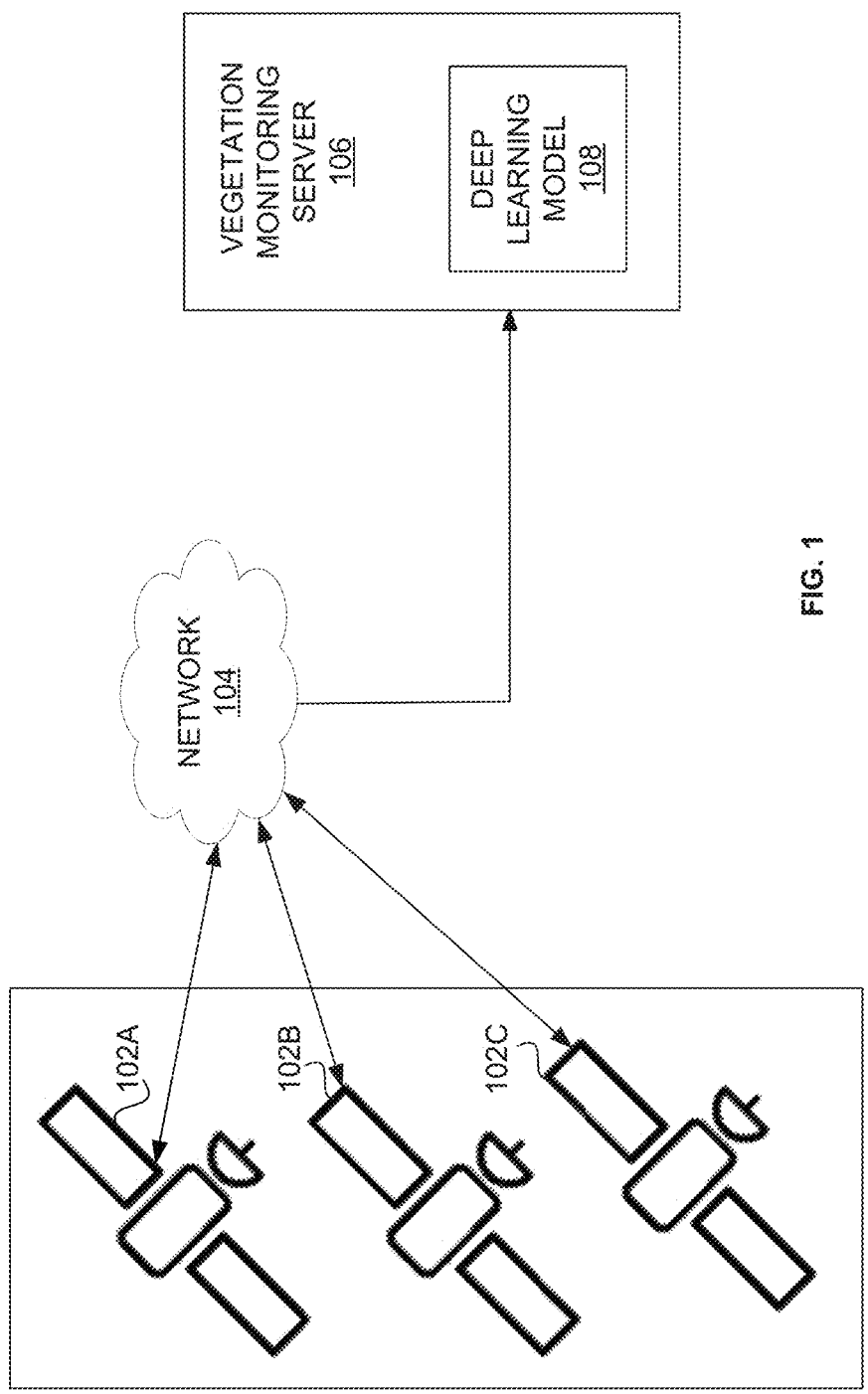
FIG. 1 illustrates a system for determining observation data from satellite images of a geographical area to monitor vegetation data in the geographical area according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be constructed as limiting the scope of the embodiments herein.

As mentioned, there remains a need for a system and method for processing satellite imagery with a high-frequency revisit to monitor vegetation for agriculture using a deep learning model. Referring now to the drawings, and more particularly to FIGS. 1 through 8, where similar reference characters denote corresponding features consistently throughout the figures, and various embodiments are shown.

The following terms are referred to in the description, which is briefly described below:

Sentinel-2 satellites survey every 10 days around the earth and collect high-resolution images of land surfaces of the earth, large islands, and inland and coastal waters. A multispectral instrument (MSI) imager of Sentinel-2 captures images in 13 spectral bands. To achieve frequent revisits and high mission availability, two identical Sentinel-2 satellites (Sentinel-2A and Sentinel-2B) operate together. The satellites are phased 180 degrees from each other in the same orbit. This allows for what would be a 10-day revisit cycle to be completed in 5 days.

Sentinel-1 satellites survey every 12 days around the earth and carry a C-band synthetic-aperture radar (SAR) instrument which provides a collection of optical data in all-weather, day, or night. To achieve frequent revisits and high mission availability, two identical Sentinel-1 satellites (Sentinel-1A and Sentinel-1B) operate together. The satellites are phased 180 degrees from each other in the same orbit. This allows for what would be a 12-day revisit cycle to be completed in 6-7 days.

Landsat-8 satellites survey every 16 days around the earth and collect multi-spectral image data affording seasonal coverage of the global landmasses. An operational land imager of Landsat-8 captures images in 11 spectral bands.

SAR-Synthetic-aperture radar is a form of radar that is used to create two-dimensional images or three-dimensional reconstructions of objects, such as landscapes.

NIR (Near Infrared)—Near-infrared spectroscopy is a spectroscopic method that uses the near-infrared region of the electromagnetic spectrum.

SWIR (Short Wave InfraRed)—is a subset of the infrared band in the electromagnetic spectrum, covering the wavelengths ranging from 1.4 to 3 microns.

RGB (Red Green Blue)—An RGB image, sometimes referred to as a true-color image.

FIG. 1 illustrates a system for determining observation data from satellite images of a geographical area to monitor vegetation data in the geographical area according to some embodiments herein. The system 100 includes one or more satellites 102A, 102B, and 102C, and a vegetation monitoring server 106 that includes a deep learning model 108. The vegetation monitoring server 106 includes a device processor and a non-transitory computer-readable storage medium storing one or more sequences of instructions, which when executed by the device processor causes the determining observation data from satellite images of a geographical area to monitor vegetation data in the geographical area. The vegetation monitoring server 106 receives one or more satellite images from one or more satellites 102A, and 102B through a network 104. The network 104 may include, but is not limited to, a wireless network, a wired network, a combination of the wired network and the wireless network or Internet, and the like.

The one or more satellite images includes a first set of satellite images that are captured in a first set of spectral bands by a first satellite 102A, a second set of satellite images that are captured in a second set of spectral bands by a second satellite 102B and a third set of satellite images that are captured in a third set of spectral bands by a third satellite 102C. The first set of satellite images may be from Sentinel-2 satellite 102A. The second set of satellite images may be from a Landsat-8 satellite 102B. In some embodiments, the first set of spectral bands, the second set of spectral bands, and the third set of spectral bands includes at least one of Synthetic Aperture Radar (SAR), Near Infrared (NIR), Short Wave InfraRed (SWIR), or Red Green Blue (RGB) bands.

The vegetation monitoring server 106 pre-processes the first set of satellite images. The vegetation monitoring server 106 adjusts a spectral band of the first set of satellite images according to a spectral band of the second set of satellite images. The multi-spectral instrument (MSI) imager of Sentinel-2 captures the first set of satellite images in 13 spectral bands. The operational land imager (OLI) of Landsat-8 captures the second set of satellite images in 11 spectral bands.

The vegetation monitoring server 106 derives a bandpass adjusted dataset of the first set of satellite images and a dataset of the second set of satellite images with NBAR (Nadir bidirectional reflectance distribution function Adjusted Reflectance) corrected surface reflectance at a resolution of 30 meters. The bandpass adjusted dataset of the first set of satellite images may be an S30 dataset and the dataset of the second set of satellite images may be an L30 dataset. The S30 dataset and L30 dataset may be used to train the deep learning model 108.

The vegetation monitoring server 106 determines at least one of a cloudy image on a day from at least one of the first set of satellite images or the second set of satellite images by comparing an intensity of each pixel of the at least one of the first set of satellite images and the second set of satellite images with a threshold intensity value. The cloudy image includes at least one cloudy or shadow pixel whose intensity is less when compared with the threshold intensity value.

The vegetation monitoring server 106 generates one or more historical cloud masks using the first set of satellite images using a remote sensing technique. The deep learning model is trained by providing one or more historical cloudy or shadow pixels and one or more historical cloud masks associated with one or more historical satellite images as training data to generate a trained deep learning model 108. In some embodiments, the vegetation monitoring server 106 obtains the third set of satellite images from a satellite 102C such as Sentinel-1 in one or more spectral bands. Thus, the vegetation monitoring server 106 provides cloud cover removal using the deep learning model 108.

The vegetation monitoring server 106 generates a reconstructed image for the cloudy image of the first set of satellite images by replacing the at least one cloudy or shadow pixel of the cloudy image with at least one labeled pixel of the first set of satellite images using the trained deep learning model 108. The at least one cloudy or shadow pixel of the cloudy image is identified by a cloud mask. In some embodiments, the vegetation monitoring server 106 generates a new image on the day when there is no image captured by the first satellite using the trained deep learning model. The vegetation monitoring server 106 determines the observation data comprising a normalized difference vegetation index (NDVI), a normalized difference water index (NDWI) from the reconstructed image to monitor vegetation data of the geographical area. In some embodiments, the observation data from the reconstructed image are analysed to monitor vegetation data of the geographical area. The vegetation data includes at least one of a prediction window for sowing, a farm-level tillage area estimation, a sowing progress rate estimation, a high accuracy crop area estimation, monitoring crop health or stress monitoring at farm-level, a harvest prediction window, harvest progression, a crop yield estimation, or crop classification in tropical regions over a large area. Also, the vegetation monitoring server 106 analyzes crop classification in tropical regions over a large area on time using the satellite data.

In some embodiments, the vegetation monitoring server 106 reconstructs an image from the first set of satellite images or the second set of satellite images or from both that is not available on the particular date. In some embodiments, the vegetation monitoring server 106 replaces with the third set of satellite images of a particular date when there is no image for the first set of satellite images captured on that particular date. In some embodiments, the replaced third set of satellite images may be at a resolution of 10 meters using an autoencoder-based model. In some embodiments, the autoencoder-based model includes 23 blocks with an input size of 256×256×5 for all bands, and to achieve in improving to 10 meters resolution, pixel shuffle may be used.

In some embodiments, a revisit time, that is time taken by the satellite 102A and the satellite 102B to capture an image of a particular region again is lowered to 1.3 days.

Figure 2:
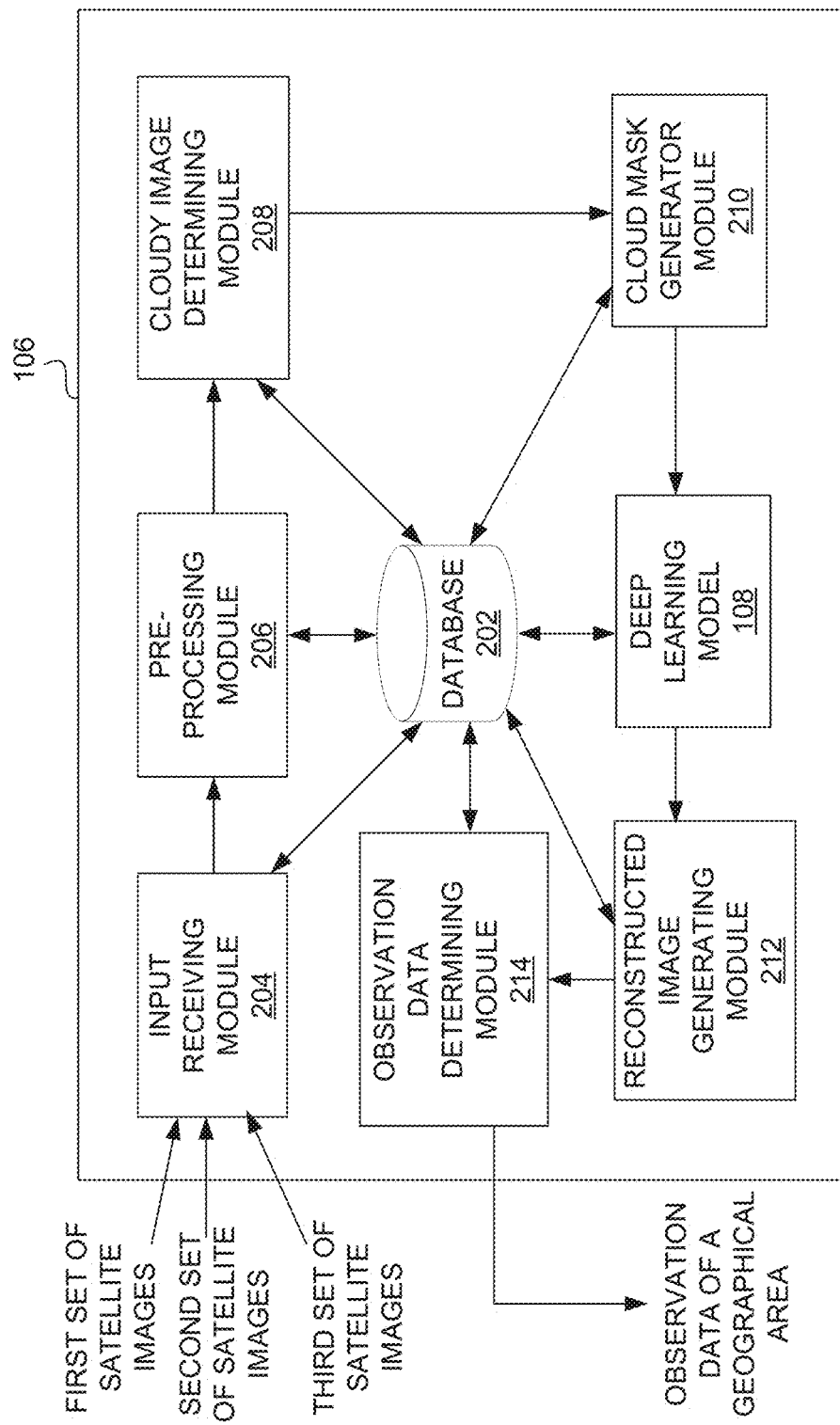
FIG. 2 illustrates a block diagram of a vegetation monitoring server according to some embodiments herein.

FIG. 2 illustrates a block diagram of a vegetation monitoring server 106 according to some embodiments herein. The block diagram of the vegetation monitoring server 106 includes a database 202, an input receiving module 204, a pre-processing module 206, a cloudy image determining module 208, a cloud mask generator module 210, a deep learning model 108, a reconstructed image generating module 212, and an observation data determining module 214. The input receiving module 204 obtains one or more satellite images of the geographical area from one or more satellites. The one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite. The first set of satellite images and the second set of satellite images are stored in the database 202. In some embodiments, the first set of satellite images may be from Sentinel-2 satellite 102A, and the second set of satellite images may be from Landsat-8 satellite 102B. The pre-processing module 206 preprocesses the first set of satellite images. The pre-processing module 206 adjusts a spectral band of the first set of satellite images according to a spectral band of the second set of satellite images. The pre-processing module 206 applies atmospheric corrections to remove the effects of the atmosphere on the first set of satellite images and the second set of satellite images to obtain atmospherically corrected first set of satellite images and the second set of satellite images. The effects of the atmosphere may be shadows, or clouds, etc. The pre-processing module 206 resamples atmospherically corrected the first set of satellite images and the second set of satellite images. The pre-processing module 206 locates land co-ordinates of a desired place on the earth using a tiling system. The tiling system may be a military grid reference system. In some embodiments, the tiling system may be applied to a resolution of 30 meters. The pre-processing module 206 obtains surface properties in several spectral bands of the desired place based on located points on the earth, using a normalization technique. The normalization technique may be a bidirectional reflectance distribution function. The surface properties are obtained at a resolution of 500 meters. The pre-processing module 206 adjusts the one or more spectral bands of the first set of satellite images with reference to the one or more spectral bands of the second set of satellite images using a bandpass adjustment. The multi-spectral instrument (MSI) imager of Sentinel-2 captures the first set of satellite images in 13 spectral bands. The MSI may be a sensor in the Sentinel-2 satellite 102A. The operational land imager (OLT) of Landsat-8 captures the second set of satellite images in 11 spectral bands.

The OLI may be a sensor in the Landsat-8 satellite 102B. The pre-processing module 206 derives a bandpass adjusted dataset of the first set of satellite images and a dataset of the second set of satellite images with NBAR (Nadir bidirectional reflectance distribution function Adjusted Reflectance) corrected surface reflectance at a resolution of 30 meters.

The cloudy image determining module 208 determines at least one of a cloudy image on a day from at least one of the first set of satellite images or the second set of satellite images by comparing an intensity of each pixel of the at least one of the first set of satellite images and the second set of satellite images with a threshold intensity value, the cloudy image includes at least one cloudy or shadow pixel whose intensity is less when compared with the threshold intensity value. The cloud mask generator module 210 generates one or more historical cloud masks using the first set of satellite images using a remote sensing technique. The deep learning model is trained by providing one or more historical cloudy or shadow pixels and one or more historical cloud masks associated with one or more historical satellite images as training data to generate a trained deep learning model 108. In some embodiments, the vegetation monitoring server 106 obtains the third set of satellite images from a satellite 102C such as Sentinel-1 in one or more spectral bands.

The reconstructed image generating module 212 generates a reconstructed image for the cloudy image of the first set of satellite images by replacing the at least one cloudy or shadow pixel of the cloudy image with at least one labeled pixel of the first set of satellite images using the trained deep learning model. The at least one cloudy or shadow pixel of the cloudy image is identified by a cloud mask.

The observation data determining module 214 determines the observation data comprising a normalized difference vegetation index (NDVI), and a normalized difference water index (NDWI) from the reconstructed image to monitor vegetation data of the geographical area. In some embodiments, the observation data from the reconstructed image are analysed to monitor vegetation data of the geographical area.

Figure 3:
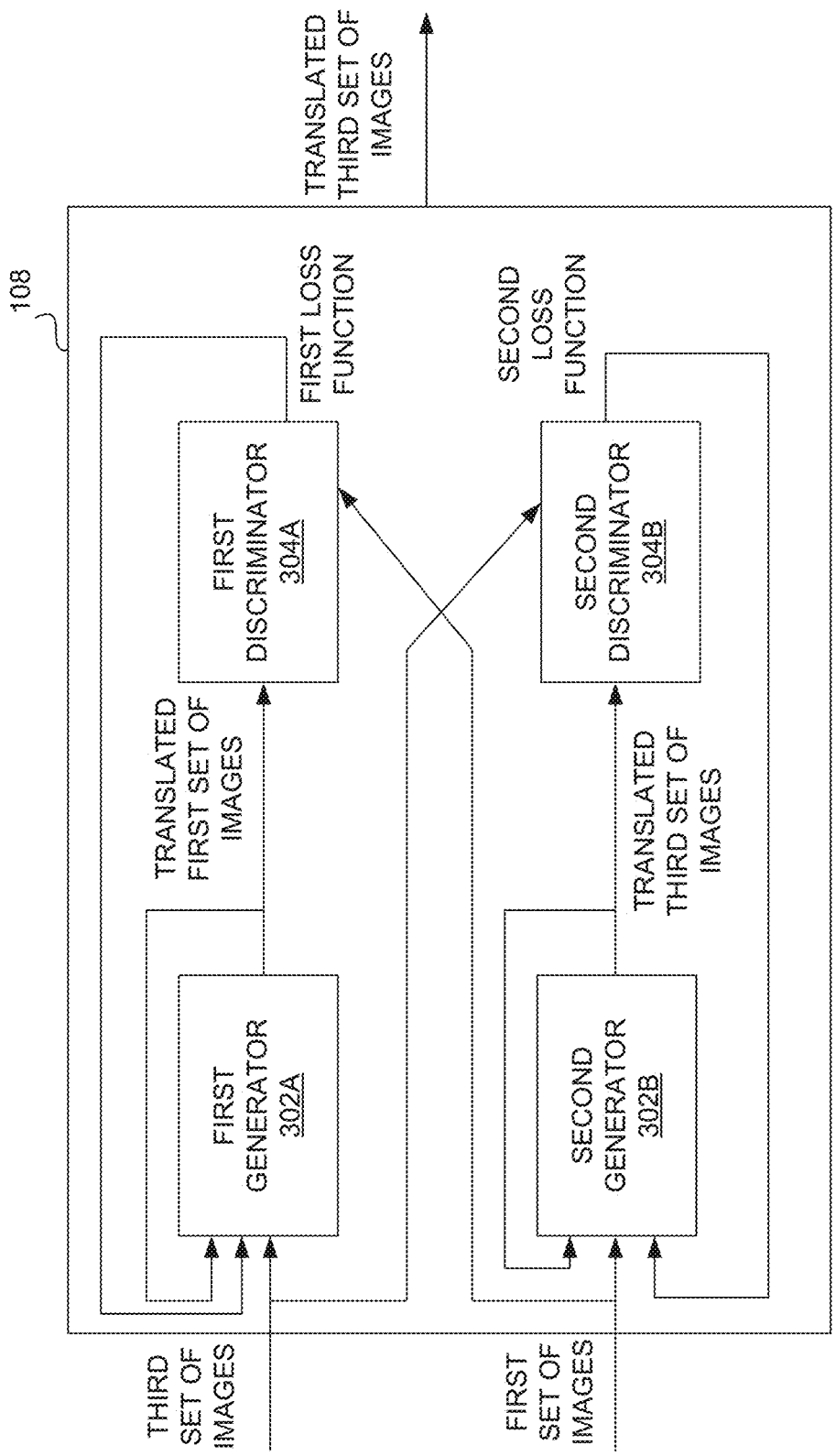
FIG. 3 illustrates a block diagram of a deep learning model according to some embodiments herein.

FIG. 3 illustrates a block diagram of a deep learning model 108 according to some embodiments herein. The block diagram of the deep learning model 108 includes a first generator 302A, a second generator 302B, a first discriminator 304A, and a second discriminator 304B. The deep learning model 108 is trained by providing one or more historical cloudy or shadow pixels and one or more historical cloud masks associated with one or more historical satellite images as training data to generate a trained deep learning model. The deep learning model 108 is trained by, (i) obtaining, by the first generator 302A, a third set of historical satellite images and converting a spectral band of the third set of historical satellite images to a common spectral band to generate a first set of converted images; (ii) obtaining, by the second generator 302B, a first set of historical satellite images and converting a spectral band of the first set of historical satellite images to the common spectral band to generate a third set of converted images; (iii) providing, to a first discriminator 304A, the third set of historical satellite images and the first set of converted images to determine a first loss function when there is a difference between the third set of historical satellite images and the first set of converted images; (iv) providing, to a second discriminator 304B, the first set of historical satellite images and the third set of converted images to determine a second loss function when there is a difference between the first set of historical satellite images and the third set of converted images; (v) backpropagating the first loss function to the first generator 302A and the second loss function to the second generator 302B to optimize the first set of converted images and the third set of converted images such that the first loss function and the second loss function becomes zero; (vi) generating an optimized converted third set of images as the historical cloud masks with the at least one labelled pixel to patch up the cloudy image of the first set of satellite images; and (vii) providing the historical cloud masks as the training data for training the deep learning model.

In some embodiments, the third set of satellite images are obtained from a satellite 102C such as Sentinel-1.

Figure 4:
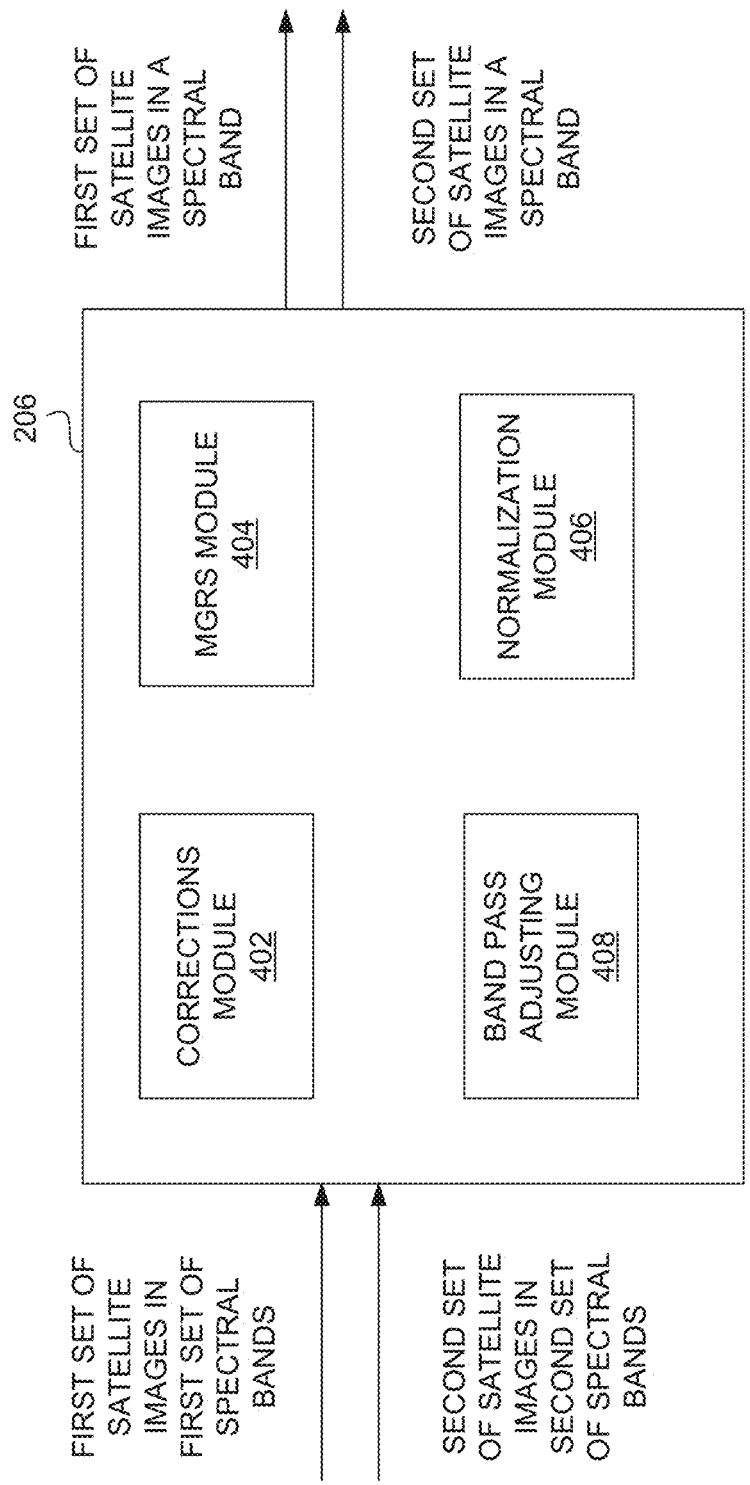
FIG. 4 illustrates a block diagram of a pre-processing module according to some embodiments herein.

FIG. 4 illustrates a block diagram of a pre-processing module 206 according to some embodiments herein. The block diagram of the pre-processing module 206 includes a corrections module 402, an MGRS module 404, a normalization module 406, a bandpass adjusting module 408. The pre-processing module 206 pre-processes the first set of satellite images and the second set of satellite images in one or more spectral bands. The corrections module 402 applies atmospheric corrections to remove the effects of the atmosphere on the first set of satellite images and the second set of satellite images. The effects of the atmosphere may be shadows, or clouds, etc. The MGRS module 404 resamples atmospherically corrected the first set of satellite images and the second set of satellite images. The MGRS module 404 locates land co-ordinates of a desired place on the earth using a tiling system. The tiling system may be a military grid reference system. In some embodiments, the tiling system may be applied to a resolution of 30 meters. The normalization module 406 obtains surface properties in one or more spectral bands of the desired place based on located points on the earth, using a normalization technique. The normalization technique may be a bidirectional reflectance distribution function. The surface properties are obtained at a resolution of 500 meters. The bandpass adjusting module 408 adjusts a spectral band of the first set of satellite images according to a spectral band of the second set of satellite images by pre-processing the first set of satellite images.

In some embodiments, a wavelength of NIR ranges from 726.8 micrometers to 938.8 nanometers for the first set of satellite images, a wavelength of SAR ranges from 1.1 centimeters to 0.8 centimeters for the first set of satellite images, a wavelength of SWIR ranges from 1522.7 nanometers to 1704.7 nanometers for the first set of satellite images, a wavelength of blue band ranges from 426.4 nanometers to 558.4 nanometers for the first set of satellite images, a wavelength of green band ranges from 523.8 nanometers to 595.8 nanometers for the first set of satellite images, a wavelength of red band ranges from 695.6 nanometers to 633.6 nanometers for the first set of satellite images, a wavelength of NIR ranges from 0.5 micrometers to 0.68 micrometers for the second set of satellite images, a wavelength of SAR ranges from 1.1 centimeters to 0.8 centimeters for the second set of satellite images, a wavelength of SWIR ranges from 11.5 micrometers to 12.5 micrometers for the second set of satellite images, a wavelength of blue band ranges from 0.45 micrometers to 0.515 micrometers for the second set of satellite images, a wavelength of green band ranges from 0.525 micrometers to 0.6 micrometers for the second set of satellite images, a wavelength of red band ranges from 0.630 micrometers to 0.680 micrometers for the second set of satellite images.

Figure 5:
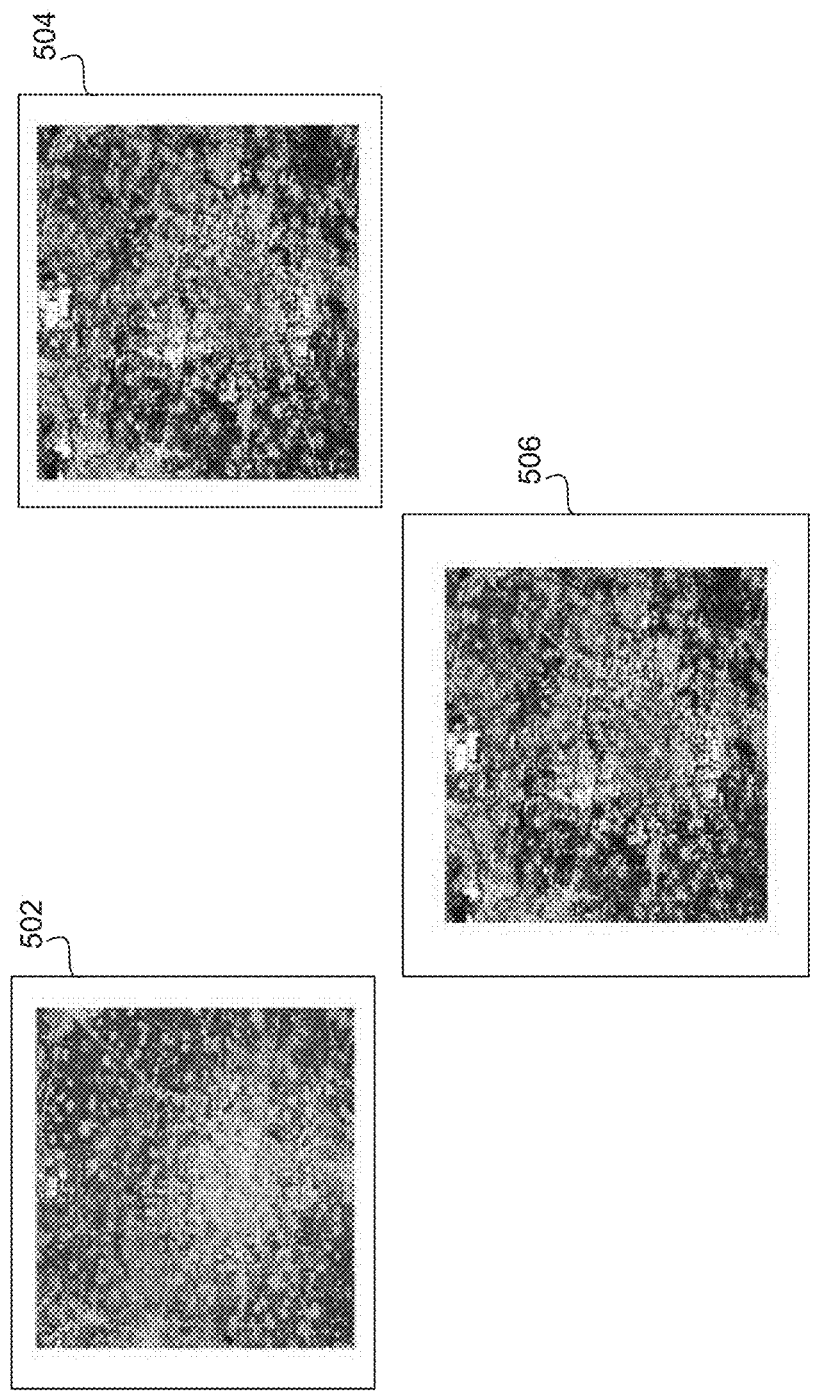
FIG. 5 illustrates an exemplary view of satellite imagery for training a deep learning model according to some embodiments herein.

FIG. 5 illustrates an exemplary view of satellite imagery for training a deep learning model 108 according to some embodiments herein. The exemplary view of satellite imagery includes an input image from a third set of satellite images 502, a cloudy image from the first set of satellite images 504, a reconstructed image 506. The deep learning model 108 obtains the input image 502 from the third set of satellite images from a satellite 102C, may be Sentinel-1. The deep learning model obtains the cloudy image from the first set of satellite images 504 for reconstruction. The trained deep learning model 108 generates the reconstructed image 506 from the cloudy image of the first set of satellite images 504 by replacing the at least one cloudy or shadow pixel of the cloudy image with at least one labeled pixel of a cloud mask.

Figure 6:
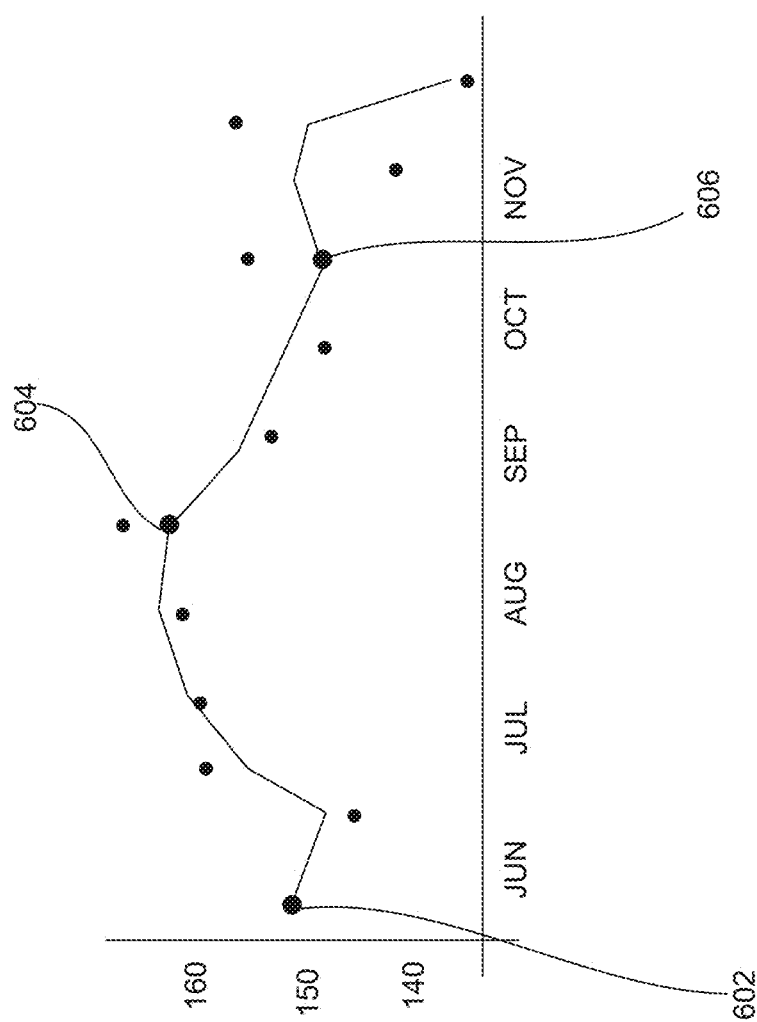
FIG. 6 illustrates an exemplary view of observation data according to some embodiments herein.

FIG. 6 illustrates an exemplary view of observation data according to some embodiments herein. The exemplary view of observation data includes a time series plot for crops by taking NDVI (normalized difference vegetation index) on Y-axis and time on X-axis. The time series plot provides crop classification by using reconstructed NDVI images. The time series plot shown in FIG. 6 is for a wheat crop. At 602, 604, 606 the reconstructed NDVI images are shown. In some embodiments, the observation data is determined by, (i) determining the NDVI using a ratio of subtracting values of pixels of Near Infrared (NIR) band with values of pixels of Red (R) band and adding values of pixels of NIR band with values of pixels of the R band, and (ii) determining the NDWI using a ratio of subtracting values of pixels of NIR band with values of pixels of Short Wave InfraRed (SWIR) band and adding values of pixels of NIR band with values of pixels of the SWIR band.

The NDVI is calculated based on values of pixels of each band of the second set of satellite images, for example, $$NDVI = \frac{NIR - RED}{NIR + RED}$$

wherein, NIR—Near-infrared values of pixels, Red—Red values of pixels of the second set of satellite images. The NDWI is calculated based on values of pixels of each band of the second set of satellite images, for example, $$NDWI = \frac{NIR - SWIR}{NIR + SWIR}$$

wherein, NIR—Near-Infrared values of pixels, Red—Red values of pixels of the second set of satellite images The exemplary view of observation data provides an analysis of crop classification in tropical regions over a large area on time.

Figure 7A:
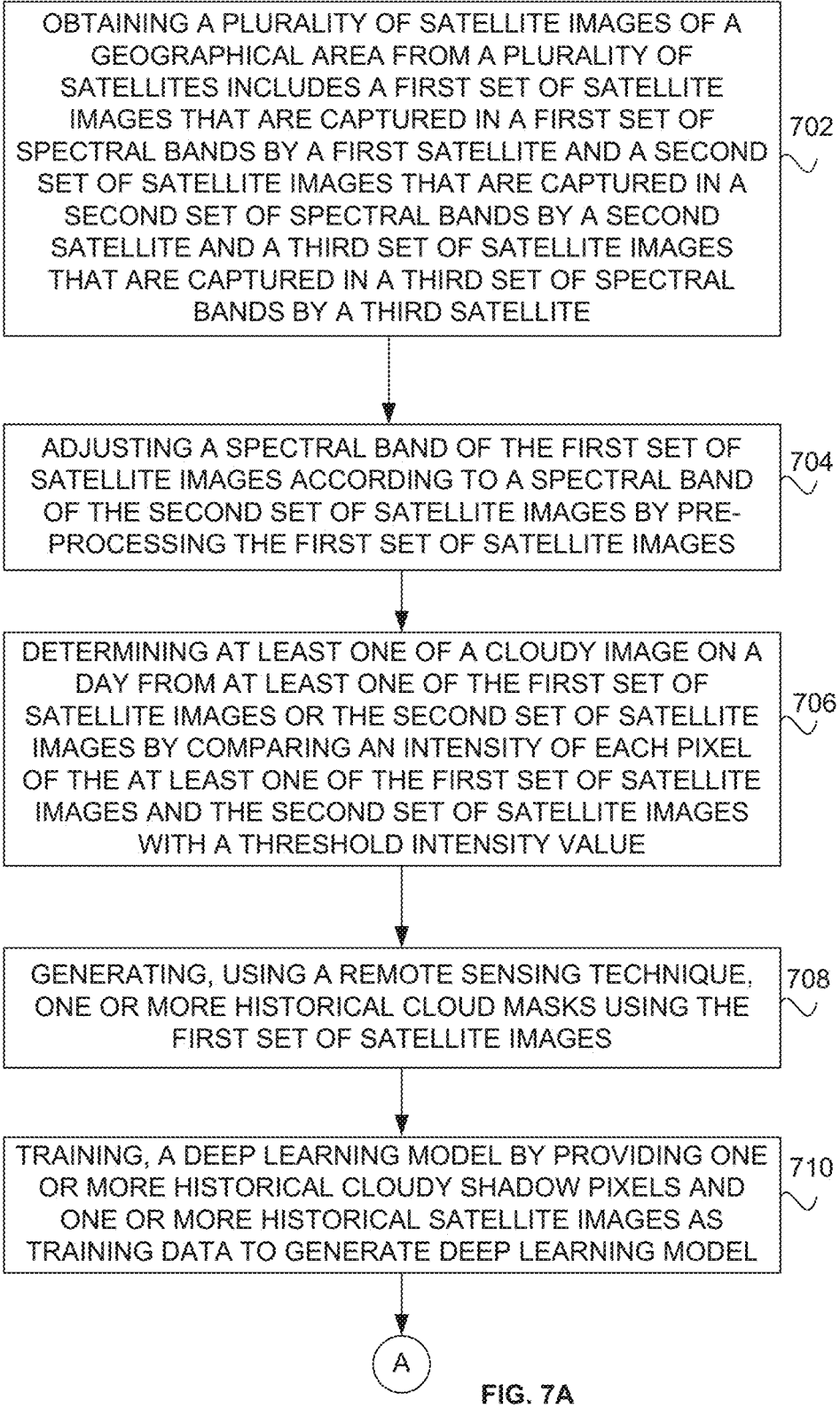
FIGS. 7A and 7B illustrate a flow diagram of a method for determining observation data from satellite images of a geographical area to monitor vegetation data in the geographical area according to some embodiments herein.
Figure 7B:
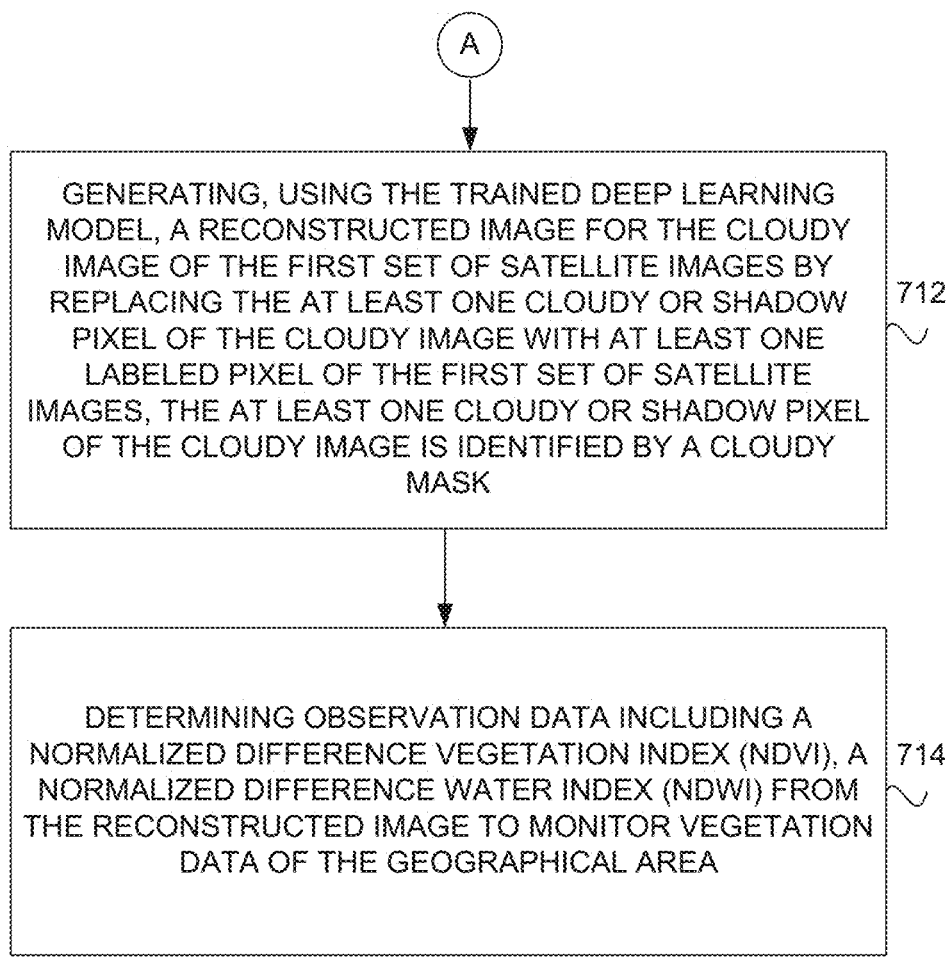

FIGS. 7A and 7B illustrate a flow diagram of a method for determining observation data from satellite images of a geographical area to monitor vegetation data in the geographical area according to some embodiments herein. At step 702, the method includes, obtaining one or more satellite images of the geographical area from one or more satellites, the one or more satellite images includes a first set of satellite images that are captured in a first set of spectral bands by a first satellite, a second set of satellite images that are captured in a second set of spectral bands by a second satellite and a third set of satellite images that are captured in a third set of spectral bands by a third satellite. At step 704, the method includes adjusting a spectral band of the first set of satellite images according to a spectral band of the second set of satellite images by pre-processing the first set of satellite images. At step 706, the method includes, determining at least one of a cloudy image on a day from at least one of the first set of satellite images or the second set of satellite images by comparing an intensity of each pixel of the at least one of the first set of satellite images and the second set of satellite images with a threshold intensity value, the cloudy image includes at least one cloudy or shadow pixel whose intensity is less when compared with the threshold intensity value. At step 708, the method includes generating, using a remote sensing technique, one or more historical cloud masks using the first set of satellite images. At step 710, the method includes, training a deep learning model by providing one or more historical cloudy or shadow pixels and one or more historical cloud masks associated with one or more historical satellite images as training data to generate a trained deep learning model. At step 712, the method includes, generating, using the trained deep learning model, a reconstructed image for the cloudy image of the first set of satellite images by replacing the at least one cloudy or shadow pixel of the cloudy image with at least one labeled pixel of the first set of satellite images, the at least one cloudy or shadow pixel of the cloudy image is identified by a cloud mask. At step 714, the method includes, determining the observation data comprising a normalized difference vegetation index (NDVI), a normalized difference water index (NDWI) from the reconstructed image to monitor vegetation data of the geographical area.

Figure 8:
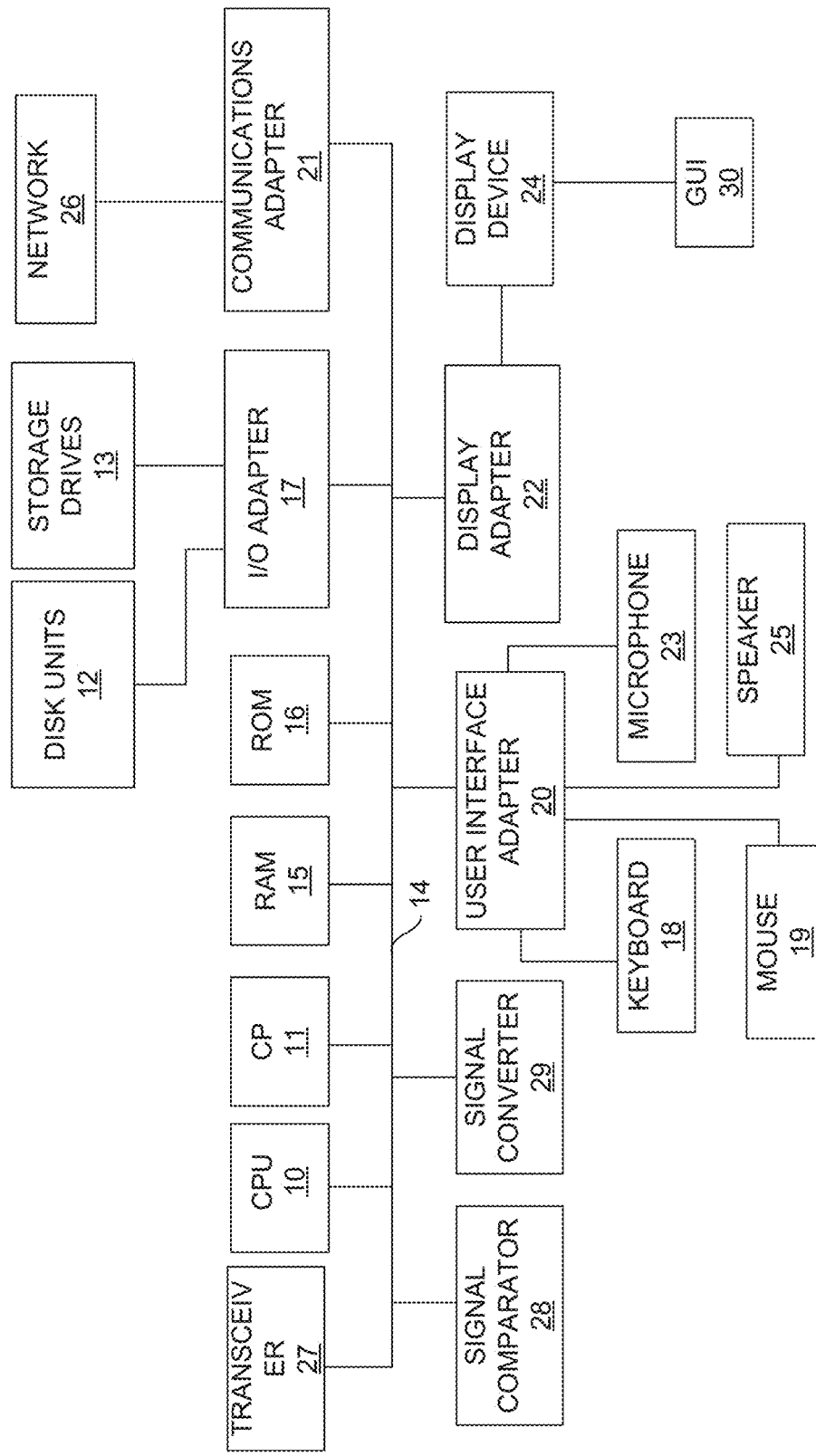
FIG. 8 is a schematic diagram of a computer architecture in accordance with embodiments herein.

A representative hardware environment for practicing the embodiments herein is depicted in FIG. 8, with reference to FIGS. 1 through 7. This schematic drawing illustrates a hardware configuration of a vegetation monitoring server 106/computer system/computing device in accordance with the embodiments herein. The system includes at least one processing device CPU 10 and at least one graphical processing device GPU 38 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The system and method of processing satellite imagery to monitor vegetation for agriculture using a deep learning model are provided. The system provides optical satellite data with less than 3 days of revisit time for agricultural monitoring. The system also provides satellite data at a single spatial resolution of 10 meters for efficient agricultural monitoring. The system provides a prediction window for sowing, estimating farm level tillage area, estimating sowing progress rate, estimating high accuracy crop area, monitoring crop health or stress monitoring at farm-level, predicting harvest window, harvest progression, estimating crop yield in agricultural monitoring. Also, the system analyzes crop classification in tropical regions over a large area on time using the satellite data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for determining observation data from satellite images of a geographical area to monitor vegetation data in the geographical area, wherein the method comprises, obtaining a plurality of satellite images of the geographical area from a plurality of satellites, wherein the plurality of satellite images comprises a first set of satellite images that are captured in a first set of spectral bands by a first satellite, a second set of satellite images that are captured in a second set of spectral bands by a second satellite and a third set of satellite images that are captured in a third set of spectral bands by a third satellite;

adjusting a spectral band of the first set of satellite images according to a spectral band of the second set of satellite images by pre-processing the first set of satellite images;

determining at least one of a cloudy image on a day from at least one of the first set of satellite images or the second set of satellite images by comparing an intensity of each pixel of the at least one of the first set of satellite images and the second set of satellite images with a threshold intensity value, wherein the cloudy image comprises at least one cloudy or shadow pixel whose intensity is less when compared with the threshold intensity value;

generating, using a remote sensing technique, a plurality of historical cloud masks using the first set of satellite images;

training a deep learning model by providing a plurality of historical cloudy or shadow pixels and a plurality of historical cloud masks associated with a plurality of historical satellite images as training data to generate a trained deep learning model;

generating, using the trained deep learning model, a reconstructed image for the cloudy image of the first set of satellite images by replacing the at least one cloudy or shadow pixel of the cloudy image with at least one labeled pixel of the first set of satellite images, wherein the at least one cloudy or shadow pixel of the cloudy image is identified by a cloud mask; and determining the observation data comprising a normalized difference vegetation index (NDVI), and a normalized difference water index (NDWI) from the reconstructed image to monitor vegetation data of the geographical area.

2. The processor-implemented method of claim 1, wherein the first set of satellite images, and the second set of satellite images are pre-processed by, applying atmospheric corrections to remove effects of atmosphere on the first set of satellite images and the second set of satellite images to obtain atmospherically corrected first set of satellite images and the second set of satellite images;

resampling the atmospherically corrected first set of satellite images and the second set of satellite images;

locating land co-ordinates of the geographical area on the first set of satellite images and the second set of satellite images that are resampled;

obtaining surface properties of the geographical area based on the located land co-ordinates; and adjusting the spectral band of the first set of satellite images according to the spectral band of the second set of satellite images based on the surface properties of the geographical area.

3. The processor-implemented method of claim 1, wherein the deep learning model is trained by, obtaining, by a first generator, a third set of historical satellite images and converting a spectral band of the third set of historical satellite images to a common spectral band to generate a first set of converted images;

obtaining, by a second generator, a first set of historical satellite images and converting a spectral band of the first set of historical satellite images to the common spectral band to generate a third set of converted images;

providing, to a first discriminator, the third set of historical satellite images and the first set of converted images to determine a first loss function when there is a difference between the third set of historical satellite images and the first set of converted images;

providing, to a second discriminator, the first set of historical satellite images and the third set of converted images to determine a second loss function when there is a difference between the first set of historical satellite images and the third set of converted images;

backpropagating the first loss function to the first generator and the second loss function to the second generator to optimize the first set of converted images and the third set of converted images such that the first loss function and the second loss function becomes zero;

generating an optimized converted third set of images as the historical cloud masks with the at least one labelled pixel to patch up the cloudy image of the first set of satellite images; and providing the historical cloud masks as the training data for training the deep learning model.

4. The processor-implemented method of claim 1, wherein the observation data is determined by, (i) determining the NDVI using a ratio of subtracting values of pixels of Near Infrared (NIR) band with values of pixels of Red (R) band and adding values of pixels of NIR band with values of pixels of the R band, and (ii) determining the NDWI using a ratio of subtracting values of pixels of NIR band with values of pixels of Short Wave InfraRed (SWIR) band and adding values of pixels of NIR band with values of pixels of the SWIR band.

5. The processor-implemented method of claim 1, wherein the first set of spectral bands, the second set of spectral bands, and the third set of spectral bands comprises at least one of Synthetic Aperture Radar (SAR), Near Infrared (NIR), Short Wave InfraRed (SWIR), or Red Green Blue (RGB) bands.

6. The processor-implemented method of claim 1, wherein the method comprises generating, using the trained deep learning model, a new image on the day when there is no image captured by the first satellite.

7. The processor-implemented method of claim 1, wherein the observation data from the reconstructed image are analysed to monitor vegetation data of the geographical area, wherein the vegetation data comprises at least one of a prediction window for sowing, a farm-level tillage area estimation, a sowing progress rate estimation, a high accuracy crop area estimation, monitoring crop health or stress monitoring at farm-level, a harvest prediction window, harvest progression, a crop yield estimation, or crop classification in tropical regions over a large area.

8. The processor-implemented method of claim 1, wherein a wavelength of NIR ranges from 726.8 micrometers to 938.8 nanometers for the first set of satellite images, a wavelength of SAR ranges from 1.1 centimeters to 0.8 centimeters for the first set of satellite images, a wavelength of SWIR ranges from 1522.7 nanometers to 1704.7 nanometers for the first set of satellite images, a wavelength of blue band ranges from 426.4 nanometers to 558.4 nanometers for the first set of satellite images, a wavelength of green band ranges from 523.8 nanometers to 595.8 nanometers for the first set of satellite images, a wavelength of red band ranges from 695.6 nanometers to 633.6 nanometers for the first set of satellite images, wherein a wavelength of NIR ranges from 0.5 micrometers to 0.68 micrometers for the second set of satellite images, a wavelength of SAR ranges from 1.1 centimeters to 0.8 centimeters for the second set of satellite images, a wavelength of SWIR ranges from 11.5 micrometers to 12.5 micrometers for the second set of satellite images, a wavelength of blue band ranges from 0.45 micrometers to 0.515 micrometers for the second set of satellite images, a wavelength of green band ranges from 0.525 micrometers to 0.6 micrometers for the second set of satellite images, a wavelength of red band ranges from 0.630 micrometers to 0.680 micrometers for the second set of satellite images.

9. One or more non-transitory computer-readable storage medium storing the one or more sequence of instructions, which when executed by the one or more processors, causes to perform a method of determining observation data from satellite images of a geographical area to monitor vegetation data in the geographical area, wherein the method comprises:

obtaining a plurality of satellite images of the geographical area from a plurality of satellites, wherein the plurality of satellite images comprises a first set of satellite images that are captured in a first set of spectral bands by a first satellite, a second set of satellite images that are captured in a second set of spectral bands by a second satellite and a third set of satellite images that are captured in a third set of spectral bands by a third satellite;

adjusting a spectral band of the first set of satellite images according to a spectral band of the second set of satellite images by pre-processing the first set of satellite images;

determining at least one of a cloudy image on a day from at least one of the first set of satellite images or the second set of satellite images by comparing an intensity of each pixel of the at least one of the first set of satellite images and the second set of satellite images with a threshold intensity value, wherein the cloudy image comprises at least one cloudy or shadow pixel whose intensity is less when compared with the threshold intensity value;

generating, using a remote sensing technique, a plurality of historical cloud masks using the first set of satellite images;

training a deep learning model by providing a plurality of historical cloudy or shadow pixels and a plurality of historical cloud masks associated with a plurality of historical satellite images as training data to generate a trained deep learning model;

generating, using the trained deep learning model, a reconstructed image for the cloudy image of the first set of satellite images by replacing the at least one cloudy or shadow pixel of the cloudy image with at least one labeled pixel of the first set of satellite images, wherein the at least one cloudy or shadow pixel of the cloudy image is identified by a cloud mask; and determining the observation data comprising a normalized difference vegetation index (NDVI), and a normalized difference water index (NDWI) from the reconstructed image to monitor vegetation data of the geographical area.

10. A system for determining observation data from satellite images of a geographical area to monitor vegetation data in the geographical area, wherein the system comprises:

a vegetation monitoring server that receives a plurality of satellite images of the geographical area from a plurality of satellites, wherein the plurality of satellite images comprises a first set of satellite images that are captured in a first set of spectral bands by a first satellite, a second set of satellite images that are captured in a second set of spectral bands by a second satellite and a third set of satellite images that are captured in a third set of spectral bands by a third satellite, wherein the vegetation monitoring server comprises, a memory that stores a database and a set of modules;

a processor in communication with the memory, the processor retrieving executing machine-readable program instructions from the memory which, when executed by the processor, enable the processor to:

adjust a spectral band of the first set of satellite images according to a spectral band of the second set of satellite images by pre-processing the first set of satellite images;

determine at least one of a cloudy image on a day from at least one of the first set of satellite images or the second set of satellite images by comparing an intensity of each pixel of the at least one of the first set of satellite images and the second set of satellite images with a threshold intensity value, wherein the cloudy image comprises at least one cloudy or shadow pixel whose intensity is less when compared with the threshold intensity value:

characterized in that, generate, using a remote sensing technique, a plurality of historical cloud masks using the first set of satellite images;

train a deep learning model by providing a plurality of historical cloudy or shadow pixel and a plurality of historical cloud masks associated with a plurality of historical satellite images as training data to generate a trained deep learning model;

generate, using the trained deep learning model, a reconstructed image for the cloudy image of the first set of satellite images by replacing the at least one cloudy or shadow pixel of the cloudy image with at least one labeled pixel of the first set of satellite images, wherein the at least one cloudy or shadow pixel of the cloudy image is identified by a cloud mask; and determine the observation data comprising a normalized difference vegetation index (NDVI), a normalized difference water index (NDWI) from the reconstructed image to monitor vegetation data of the geographical area.

11. The system of claim 10, wherein the processor is configured to train the deep learning model by, obtaining, by a first generator, a third set of historical satellite images and converting a spectral band of the third set of historical satellite images to a common spectral band to generate a first set of converted images;

generating, by a second generator, a first set of historical satellite images and converting a spectral band of the first set of historical satellite images to the common spectral band to generate a third set of converted images;

providing, to a first discriminator, the third set of historical satellite images and the first set of converted images to determine a first loss function when there is a difference between the third set of historical satellite images and the first set of converted images;

providing, to a second discriminator, the first set of historical satellite images and the third set of converted images to determine a second loss function when there is a difference between the first set of historical satellite images and the third set of converted images;

backpropagating the first loss function to the first generator and the second loss function to the second generator to optimize the first set of converted images and the third set of converted images such that the first loss function and the second loss function becomes zero;

obtaining an optimized converted third set of images as the historical cloud masks with the at least one labelled pixel to patch up the cloudy image of the first set of satellite images, and providing the historical cloud masks as the training data for training to the deep learning model.

12. The system of claim 10, wherein the deep learning model is trained by, obtaining, by a first generator, a third set of historical satellite images and converting a spectral band of the third set of historical satellite images to a common spectral band to generate a first set of converted images;

obtaining, by a second generator, a first set of historical satellite images and converting a spectral band of the first set of historical satellite images to the common spectral band to generate a third set of converted images;

providing, to a first discriminator, the third set of historical satellite images and the first set of converted images to determine a first loss function when there is a difference between the third set of historical satellite images and the first set of converted images;

providing, to a second discriminator, the first set of historical satellite images and the third set of converted images to determine a second loss function when there is a difference between the first set of historical satellite images and the third set of converted images;

backpropagating the first loss function to the first generator and the second loss is function to the second generator to optimize the first set of converted images and the third set of converted images such that the first loss function and the second loss function becomes zero;

generating an optimized converted third set of images as the historical cloud masks with the at least one labelled pixel to patch up the cloudy image of the first set of satellite images, and providing the historical cloud masks as the training data for training the deep learning model.

13. The system of claim 10, wherein the observation data is determined by, (i) determining the NDVI using a ratio of subtracting values of pixels of Near Infrared (NIR) band with values of pixels of Red (R) band and adding values of pixels of NIR band with values of pixels of the R band, and (ii) determining the NDWI using a ratio of subtracting values of pixels of NIR band with values of pixels of Short Wave InfraRed (SWIR) band and adding values of pixels of NIR band with values of pixels of the SWIR band.

14. The system of claim 10, wherein the first set of spectral bands, the second set of spectral bands, and the third set of spectral bands comprises at least one of Synthetic Aperture Radar (SAR), Near Infrared (NIR), Short Wave InfraRed (SWIR), or Red Green Blue (RGB) bands.

15. The system of claim 10, wherein the processor is configured to generate, using the trained deep learning model, a new image on the day when there is no image captured by the first satellite.

16. The system of claim 10, wherein the observation data from the reconstructed image are analysed to monitor vegetation data of the geographical area, wherein the vegetation data comprises at least one of a prediction window for sowing, a farm-level tillage area estimation, a sowing progress rate estimation, a high accuracy crop area estimation, monitoring crop health or stress monitoring at farm-level, a harvest prediction window, harvest progression, a crop yield estimation, or crop classification in tropical regions over a large area.

17. The system of claim 10, wherein a wavelength of NIR ranges from 726.8 micrometers to 938.8 nanometers for the first set of satellite images, a wavelength of SAR ranges from 1.1 centimeters to 0.8 centimeters for the first set of satellite images, a wavelength of SWIR ranges from 1522.7 nanometers to 1704.7 nanometers for the first set of satellite images, a wavelength of blue band ranges from 426.4 nanometers to 558.4 nanometers for the first set of satellite images, a wavelength of green band ranges from 523.8 nanometers to 595.8 nanometers for the first set of satellite images, a wavelength of red band ranges from 695.6 nanometers to 633.6 nanometers for the first set of satellite images, wherein a wavelength of NIR ranges from 0.5 micrometers to 0.68 micrometers for the second set of satellite images, a wavelength of SAR ranges from 1.1 centimeters to 0.8 centimeters for the second set of satellite images, a wavelength of SWIR ranges from 11.5 micrometers to 12.5 micrometers for the second set of satellite images, a wavelength of blue band ranges from 0.45 micrometers to 0.515 micrometers for the second set of satellite images, a wavelength of green band ranges from 0.525 micrometers to 0.6 micrometers for the second set of satellite images, a wavelength of red band ranges from 0.630 micrometers to 0.680 micrometers for the second set of satellite images.

* * * * *